(12) United States Patent
Haderle et al.

(10) Patent No.: US 6,334,134 B1
(45) Date of Patent: Dec. 25, 2001

(54) INSERT PERFORMANCE ON A MULTI-SYSTEM TRANSACTION ENVIRONMENT

(75) Inventors: Donald James Haderle, Los Gatos; Akira Shibamiya, Los Altos; James Zu-Chia Tseng, San Jose; Julie Ann Watts, Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,834

(22) Filed: Aug. 18, 1998

(51) Int. Cl.[7] .................................................. G06F 12/00
(52) U.S. Cl. ............................................. 707/205; 707/10
(58) Field of Search ............................... 707/8, 3, 4, 509, 707/510, 511, 10, 202; 395/500, 600; 711/147; 364/200, 900

(56) References Cited

U.S. PATENT DOCUMENTS

| | | | |
|---|---|---|---|
| 4,627,019 | * 12/1986 | Ng ........................................ | 364/900 |
| 4,961,134 | * 10/1990 | Crus et al. ............................ | 364/119 |
| 4,965,719 | * 10/1990 | Shoens et al. ........................ | 364/200 |
| 5,103,459 | 4/1992 | Gilhousen et al. . | |
| 5,455,944 | 10/1995 | Haderle et al. . | |
| 5,455,946 | * 10/1995 | Mohan et al. ........................ | 395/600 |
| 5,546,579 | * 8/1996 | Josten et al. ......................... | 395/600 |
| 5,551,027 | 8/1996 | Choy et al. . | |
| 5,551,046 | 8/1996 | Mohan et al. . | |
| 5,664,160 | * 9/1997 | Facteau et al. ...................... | 395/500 |
| 5,692,182 | * 11/1997 | Desai et al. .......................... | 707/10 |
| 5,715,236 | 2/1998 | Gilhousen et al. . | |
| 6,085,296 | * 7/2000 | Karkhanis et al. .................. | 711/147 |
| 6,144,970 | * 11/2000 | Bonner et al. ....................... | 707/206 |

OTHER PUBLICATIONS

"DB2 for OS/390 Version 5 Performance Topics", International Support Organization, IBM, 2 pages (Jun. 1997).

"Methods for Space Management in Transactions Systems Supporting Fine–Granularity Locking: Record Display" Software Patent Institute Database of Software Technologies, 4 pages (Oct. 1993).

* cited by examiner

Primary Examiner—Hosain T. Alam
Assistant Examiner—Anh Ly
(74) Attorney, Agent, or Firm—Sughrue, Mion, Zinn, Macpeak & Seas, PLLC (57) ABSTRACT

A method, apparatus, and article of manufacture for a computer implemented insert system. Data is stored in a database stored on a data storage device connected to a plurality of computers. At least one look-aside space map is allocated to each of the computers. At each computer, when data is to be inserted into the database, a look-aside space map allocated to that computer is identified, and a free data page is located using the identified look-aside space map.

21 Claims, 4 Drawing Sheets

INSERT PERFORMANCE ON A MULTI-SYSTEM TRANSACTION ENVIRONMENT

BACKGROUND OF THE INVENTION

1. Field of the Invention

This invention relates in general to computer-implemented database systems, and, in particular, to improving insert performance on a multi-system transaction environment.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

In a DBMS, data records are stored in table spaces. A table space may contain one or more tables. Each table space contains a number of space map pages. Each space map page covers a number of data pages. One or more records can be stored in a single data page. All data pages within a single table space must have the same page size. Typically, a page contains 4096 bytes.

A space map page identifies the data pages that have enough free space for additional data to be inserted. Each space map page covers a fixed range of data pages. To avoid excessive updates to the space map pages, each space map page maintains only a few attributes for each data page. One of the attributes indicates how much free space remains in a data page.

When inserting a record, one or more space map pages are accessed for choosing a candidate data page. If there is a clustering index defined, the DBMS will attempt to insert the record in the same order as the clustering keys. Maintaining data records in the clustering key order enables more efficient data retrieval when the clustering index is used to retrieve a set of records within a key range.

To prevent updates from getting lost, all space map page updates are serialized. In a single-system environment, a local exclusive ("X") page latch is held before a space map page can be updated. A local X page latch is similar to a lock. As soon as the update is completed, the local X page latch is released.

In a multi-system data sharing environment, the space map page update is serialized for all transactions across all sharing systems. Therefore, the local X page latch is extended to a global scope. The global page latch is referred to as a page P-lock (i.e. physical lock). In a data sharing environment, a space map page can only be updated when both the local page latch and the page P-lock are held in exclusive mode.

Each system in the multi-system data sharing environment maintains P-locks for pages that the system owns. For a given page, since the page P-lock is owned by a system, the system also acquires the local page latch to perform intra-system serialization for updates. The page P-lock is a global lock and can only be held in exclusive mode by one system at a time. Since each system owns the page P-locks for the pages the system owns, for inter-system serialization, an owning system can give up the ownership of the page P-lock when the lock is requested by another system. Then, the updated page is externalized to a high-speed shared electronic store or shared DASD for maintaining coherency of the data before the page P-lock is released.

The process of notifying another system to release the page P-lock is called P-lock negotiation. Since each space map page covers a wide range of data pages, the space map pages are frequently updated in an insert-intensive workload. The overhead of frequent page P-lock negotiations is very high. With high space map page contentions, this could have significant impact on the overall database system throughput. The frequent page P-lock negotiation also has significant impact on transaction response time.

Therefore, there is a need in the art for an improved method of insert performance on a multi-system transaction environment.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented insert system.

In accordance with the present invention, data is stored in a database stored on a data storage device connected to a plurality of computers. At least one look-aside space map is allocated to each of the computers. At each computer, when data is to be inserted into the database, a look-aside space map allocated to that computer is identified, and a free data page is located using the identified look-aside space map.

An object of the invention is to provide a technique for improving insert performance on a multi-system transaction. Another object of the invention is to provide look-aside space map pages to improve insert performance.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
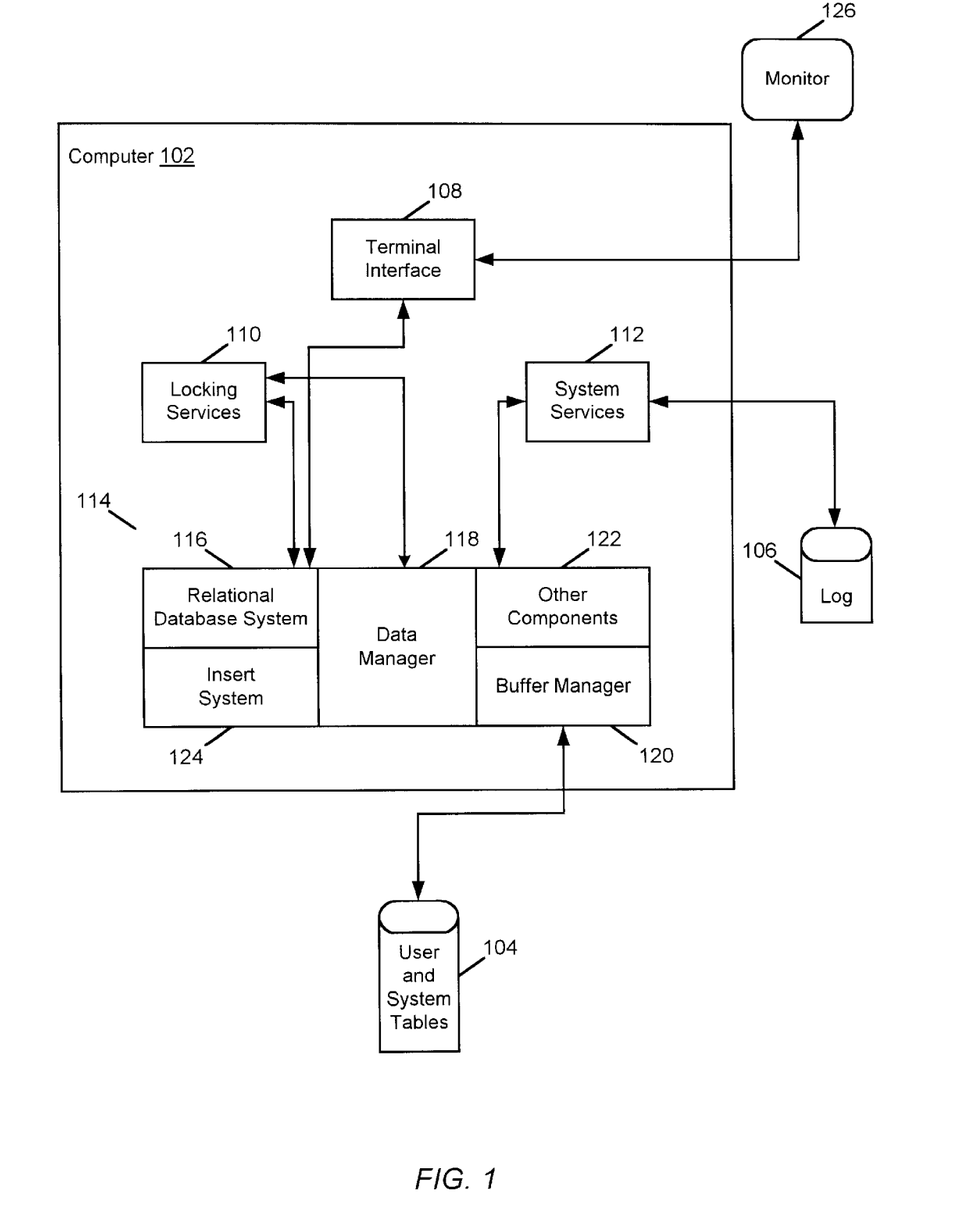
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Insert System 124, and other components 122 such as an SQL compiler/interpreter. These submodules support the functions of the SQL language, i.e. definition, access control, interpretation, compilation, database retrieval, and update of user and system data. The Insert System 124 works in conjunction with the other submodules to rebalance partitioned data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Improving Insert Performance On A Multi-System Transaction Environment

The present invention provides an insert system 124 for improved insert performance on a multi-system transaction environment for sharing data (i.e., a data sharing environment). The insert system 124 allocates one or more space map pages to each system in the multi-system transaction environment, which are referred to as look-aside space map pages. Then, instead of having all insert transactions search for free space from the same space map page, insert transactions on each system in a multi-system transaction environment search for free space from the look-aside space map pages allocated to the system. Therefore, in a multi-system transaction environment, all inserts to a table within the same system search for free space from a look-aside space map page that is currently owned by the system. Thus, all space map page updates are performed locally, within a single system. In addition, data page contentions are eliminated because the chosen data pages are used only by inserts within the same system.

Additionally, when the data pages referenced by look-aside space map pages owned by a system are full, the insert system 124 dynamically allocates additional look-aside space map pages to the system for additional data pages. By avoiding the fixed assignment of space map pages to each system, the insert system 124 is able to allow each system to obtain only as many data pages as the system needs.

Data Sharing Overview

Figure 2:
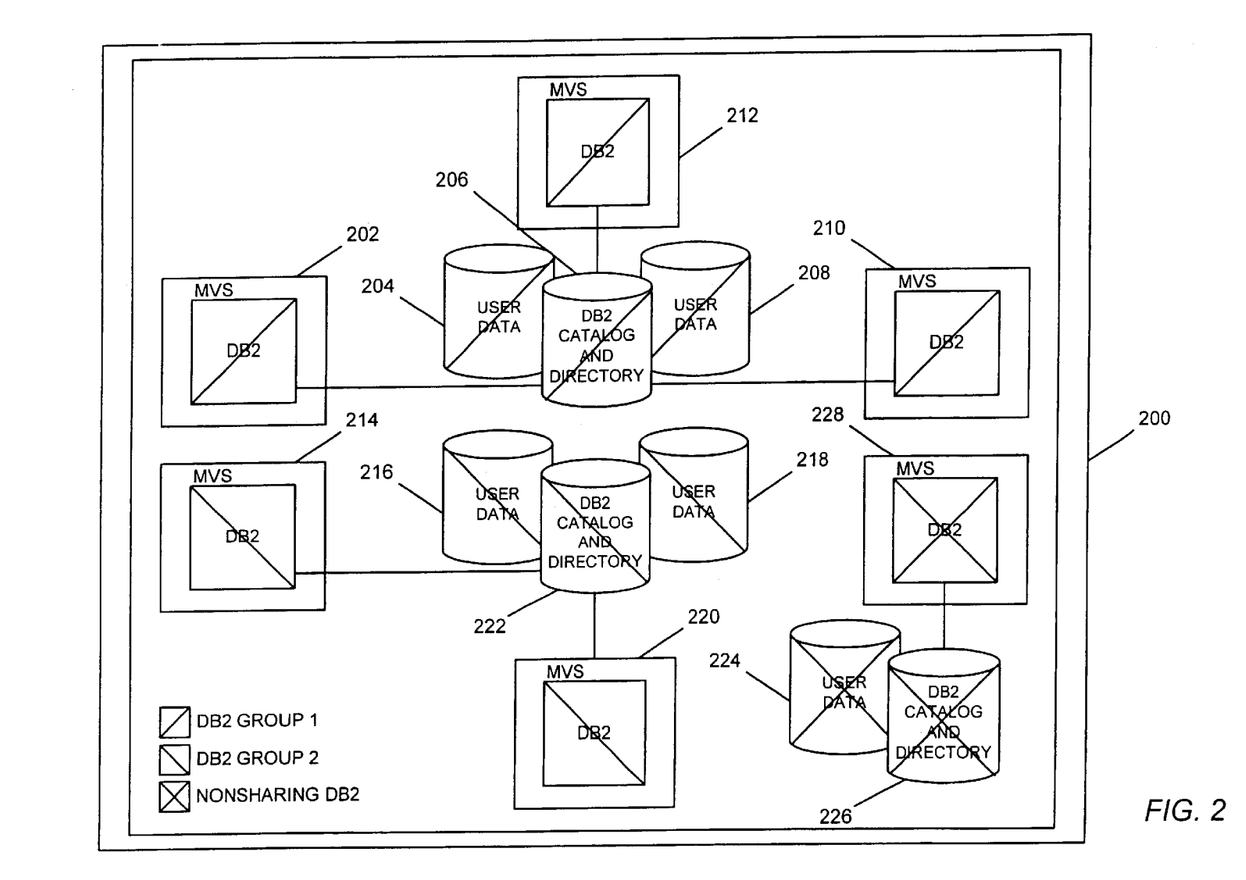
FIG. 2 is a block diagram illustrating a N-way multi-system transaction environment that could be used in accordance with the present invention.

FIG. 2 is a block diagram illustrating a N-way multi-system transaction environment 200 that could be used in accordance with the present invention. The multi-system data sharing environment 200 provides database applications with full read and write concurrent access to databases, on shared direct access storage devices (DASDs), between DB2 subsystems that are within a data sharing group. For example, DB2 subsystems 202, 210, and 212 are in a data sharing group and share data on databases 204, 206, and 208. Similarly, DB2 subsystems 214 and 220 are in a DB2 data sharing group and share databases 216, 218, and 222. The DB2 subsystems may reside on the same or on different data storage devices. A DBMS instance resides on each DB2 subsystem. A DB2 subsystem that does not share data is a nonsharing DB2. For example DB2 subsystem 228 does not share data from databases 224 and 226.

A transaction accesses data belonging to a data sharing group from within a single member (i.e., DB2 subsystem) of the group. Applications and transactions are unaware that data sharing is taking place within the data sharing group and do not know whether the data they are accessing is being actively shared. The insert system 124 automatically manages all of the multi-system concurrency and buffer coherency issues, which are transparent to the applications and transactions.

The insert system 124 assumes that all data is capable of being shared within the group. Actual sharing is controlled by workload scheduling, DASD connectivity, and authorization. The insert system 124 activates its multi-system concurrency and coherency controls only when data is actually shared between DB2 systems within a data sharing group. The insert system 124 supports data access concurrency at every level normally supported by DB2 (e.g., table space, table, page, or row).

Locking Mechanisms

When there are multiple DBMS instances, all with equal access to the shared databases, a single page may be cached in multiple DBMS buffer pools, with each buffer pool being associated with a different instance. For DB2, the page size is equal to the block size, and a block is a unit read from or written to a data storage device, such as disk. The page locking protocol to read or write a page is to acquire a share (S) lock to read the page and acquire an exclusive (X) lock to update the page. This protocol implies that there can be multiple readers or a single updater of the page within a data sharing group.

To provide transactional semantics, the exclusive locks that are obtained on updated pages are held until the transaction reaches a point of consistency (i.e., until the transaction either commits or rolls back). Transactions hold exclusive locks on the updated pages to prevent other transactions in the same DBMS instance or the other sharing DBMS instances from updating or referencing those same pages. With page-level locking, because of the global locking mechanism, the intersystem buffer coherency is not a problem, as long as the transaction locks remain held. As soon as the transaction reaches a point of consistency and releases its exclusive locks on the pages that it has updated, a different transaction that is executing on a second DBMS instance can obtain the locks on those same pages and can manipulate them in the local buffer pool of its corresponding DBMS instance. If proper controls are not in place, the cache coherency problem can be readily visualized—a down-level version of the page (i.e., a version of the page that does not reflect the latest committed updates to the data) might be read into the local buffer pool from external storage (e.g., disk) or previously cached in the local buffer pool of the second DBMS instance and used as-is.

To prevent these problems, intersystem cache coherency protocols are followed. DB2 data sharing does this by using a force-at-commit policy for updated database pages. Force-at-commit implies that the updated page is written to external storage so that other DB2 members can read the latest version and the current down-level versions of the page that are cached in other DBMS instance buffer pools are cross-invalidated ("XIed").

In the other DB2 members, any subsequent access to the XIed buffer pool page detects the invalid condition of the page and refreshes the current version of the page from external storage.

P-locks are acquired by a buffer manager for a DB2 member on a page set to declare the physical read or write interest of a DB2 member in the page set. The physical read or write interest reflects the actual physical access characteristics of the transactions that are running on that DB2 member. When dealing with buffer coherency issues, the insert system 124 is concerned with the actual physical read or update operations against the data. Thus, the DB2 data sharing buffer coherency protocols are controlled by P-locks. The purpose of P-locks is to ensure that the proper cache coherency protocols are used in a multi-system environment. P-locks are owned by the DB2 member.

P-locks are negotiable. That is, if one of the DB2 members changes the state of its P-lock on a resource (e.g., page set or partition) due to a change in the physical access characteristics on the resource (e.g., the DB2 member is going from read only ("RO") to read/write ("R/W") physical interest on a page set), the other DB2 members that hold a P-lock on that resource will be notified of this change in the inter-DB2 interest on the P-lock. Then, each DB2 member can then dynamically make any necessary adjustments in the cache coherency processing for the resource and downgrade or upgrade its P-lock state (negotiate the P-lock) accordingly. The P-lock negotiation process allows DB2 members to react dynamically to the changes of inter-DB2 interest and to enact intersystem buffer coherency protocols only when there is actual physical inter-DB2 R/W sharing of a page set.

For DB2, the page size is the same as the block size, and a block is a unit of disk that is read or written. Therefore, when page-level transaction locking is in effect with DB2 data sharing, DB2 can ensure that physical consistency of the pages is maintained, because the global page lock ensures that only one transaction process can update the page at a given time. However, when subpage concurrency, is allowed (e.g., row level locking on data pages), the global transaction lock is not held at the block level. Unless prevented, transactions running on different DB2 members could be allowed to update the same block or page at the same time, with one DB2 member possibly backing out the updates of another as the block gets written to external storage.

A latch is a memory-based serialization technique. That is, the control of which transaction holds the X latch or which transaction holds the S latch and which transactions are waiting for the latch on a given resource is accomplished by using compare and swap logic on a specific area in virtual memory associated with that resource (i.e., usually a control block). However, in a multi-system data sharing environment, because there are distributed memories (i.e., each DB2 member has its own virtual memory spaces), the memory-based latching technique no longer guarantees serialization across all the transactions. Thus, the scope of the page latch is expanded across all DB2 members to maintain the physical consistency of the page when subpage concurrency is allowed.

To do this, the insert system 124 uses a P-lock on the page as a global page latch. The page P-lock is owned by the DB2 member, and not by the transaction. Also, the page P-lock is negotiable. Because the P-lock is not owned by any transaction, the P-lock on a page can be released before or after the transactions that are updating the page reach a point of consistency. Therefore, using the page P-lock, different transactions running on two different DB2 members can obtain exclusive locks on different rows in the same page, and each transaction can update its exclusively locked row without requiring that the earlier transaction reaches a point of consistency.

Because the P-lock is system-owned and not transaction-owned, if a transaction needs to access a page in a manner that requires a P-lock on the page, the P-lock may already be held by that DB2 member due to a read or update to the page from a previous transaction on that DB2.

The Insert System

The insert system 124 proposes a new type of space management scheme for inserts with the following characteristics:

INSERT does not cluster the data using a cluster index, even if the cluster index is defined.

INSERT chooses an insert location to avoid lock and latch contention.

Each system maintains its own look-aside space map page by holding the P-lock with a longer lock duration. The insert system 124 allows a user to limit the number of data pages covered by a single space map page to prevent large gaps of unused data pages.

Figure 3:
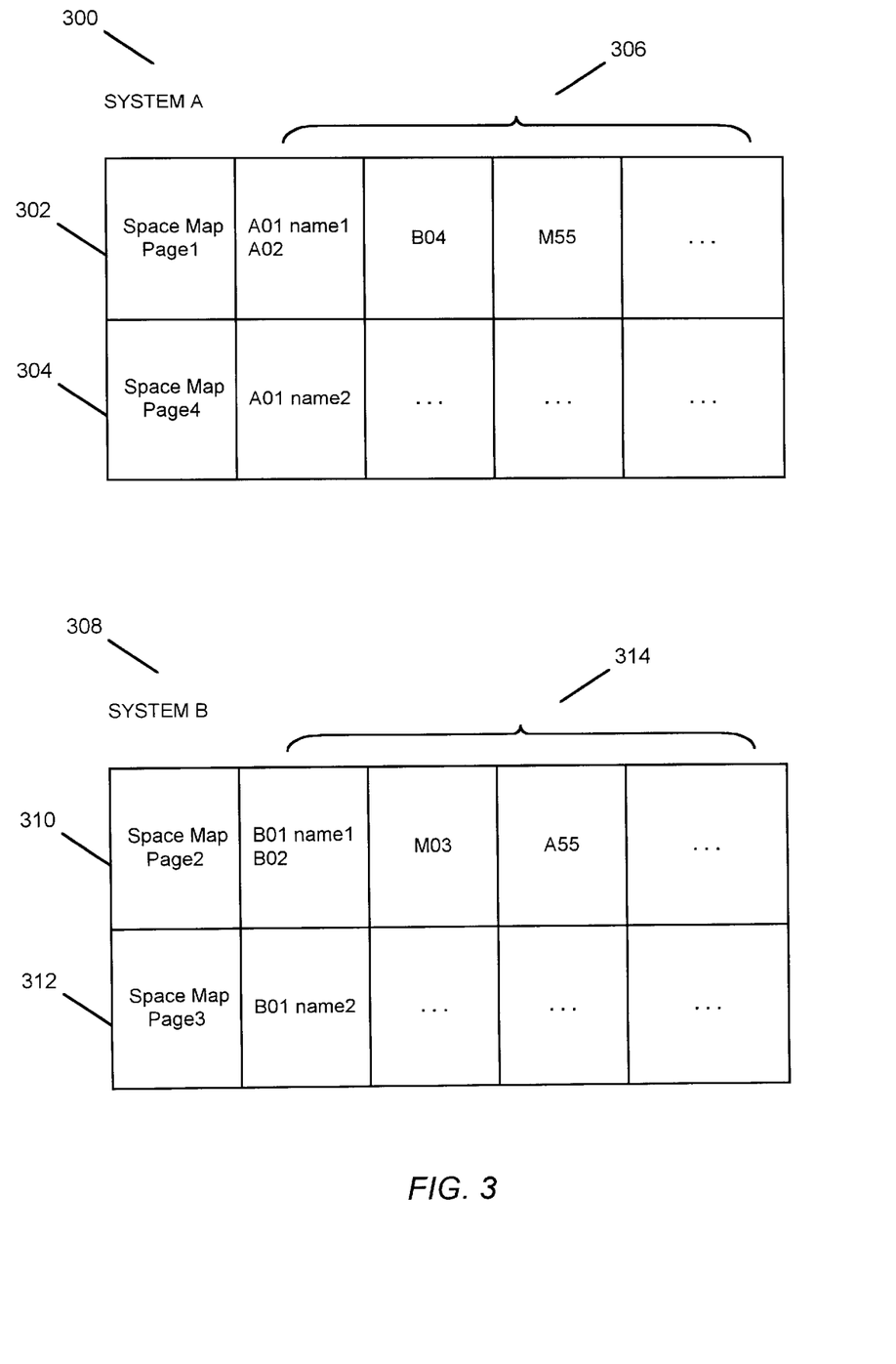
FIG. 3 is a block diagram illustrating look-aside space map pages of the insert system that could be used in accordance with the present invention.

FIG. 3 is a block diagram illustrating look-aside space map pages of the insert system 124 that could be used in accordance with the present invention. System A 300 and System B 308 share data. Initially, the insert system 124 allocates look-aside space map page1 302 to System A 300 and allocates look-aside space map page2 310 to System B 308. Although this example shows the insert system 124 allocating one look-aside space map page initially, the insert system 124 can allocate any number of look-aside space map pages to each system. Look-aside pace map page1 302 contains information about data pages 306, and look-aside space map page2 310 contains information about data pages 314. In the preferred embodiment of the present invention, there is one look-aside space map page allocated per tablespace.

For example, assume that System B 308 needs additional data pages. Then the insert system 124 dynamically allocates look-aside space map page3 312 to System B 308. Then, if System A 300 needs additional data pages, the insert system 124 dynamically allocates look-aside space map page4 304 to System A 300.

By isolating inserts from each system to its own set of data pages and look-aside space map pages, the insert system 124 eliminates the data sharing P-lock negotiations for space map page updates. The P-lock negotiation process involves externalizing of the updated space map page to the external shared data storage device (e.g., DASD). For a database system using the write ahead logging protocol, the database recovery logs are forced to log datasets before the updated space map page is written to the shared data storage device.

The insert system 124 also helps to eliminate P-lock negotiations on data pages when row level locking is used. With row level locking in a data sharing environment, a DBMS acquires the page P-lock on a data page, in addition to the row lock, before a record can be inserted into a data page. The insert system 124 will hold page P-locks longer than in conventional systems for a member-cluster type tablespace. Instead of releasing the page P-locks at the time an updated transaction has reached a point of consistency, the insert system 124 keeps the P-locks until those pages are removed from the system's local buffer pool or at the time that the page P-lock is requested by another system. That is, with the insert system 124, since a system will have a P-lock on a data page, multiple transactions on that system can obtain row locks on different rows of the data page and modify those rows. By keeping the page P-locks longer, the insert system 124 reduces the number of page P-lock/unlock requests for multiple transactions inserting rows within the same data page. This reduces the number of data page P-lock/unlock requests for multiple transactions inserting rows within the same page.

Instead of using a fixed assignment of the space map pages to each system, the insert system 124 uses a dynamic assignment scheme. The dynamic assignment is done via the P-lock on the look-aside space map pages.

On behalf of the first insert from a system, a conditional P-lock is requested on a selected space map page. If the P-lock can not be granted immediately, the insert system 124 recognizes that the associated space map page is currently actively used by other systems. A conditional P-lock is requested again for another chosen space map page. The insert system continues this process until the P-lock on a chosen space map page is granted in exclusive mode. The chosen space map page becomes a look-aside space map page for the system wanting to insert data Once the P-lock is granted, the insert system 124 performs a space search for the chosen look-aside space map page. Once a candidate data page is found, the insert system 124 inserts a record into the data page, after the page or row lock is obtained. To alleviate lock contention on data pages for inserts, the page or row lock will also be requested conditionally. If row level locking is used, a page P-lock will also be acquired on the chosen data page before the row lock is requested. To avoid page P-lock contention on data pages for inserts, the insert system 124 also uses conditional lock requests for P-locks on data pages.

Using the technique of the insert system 124, the DBMS does not maintain data records in the order of the clustering index key sequence, even if a clustering index is defined on the table. If the clustering order is important to the query performance, a user could perform a database reorganization after the data is inserted. Since the database reorganization is performed by a single process within a single system, the data could be restored to the clustering key sequence without having any multi-system performance overhead.

Figure 4:
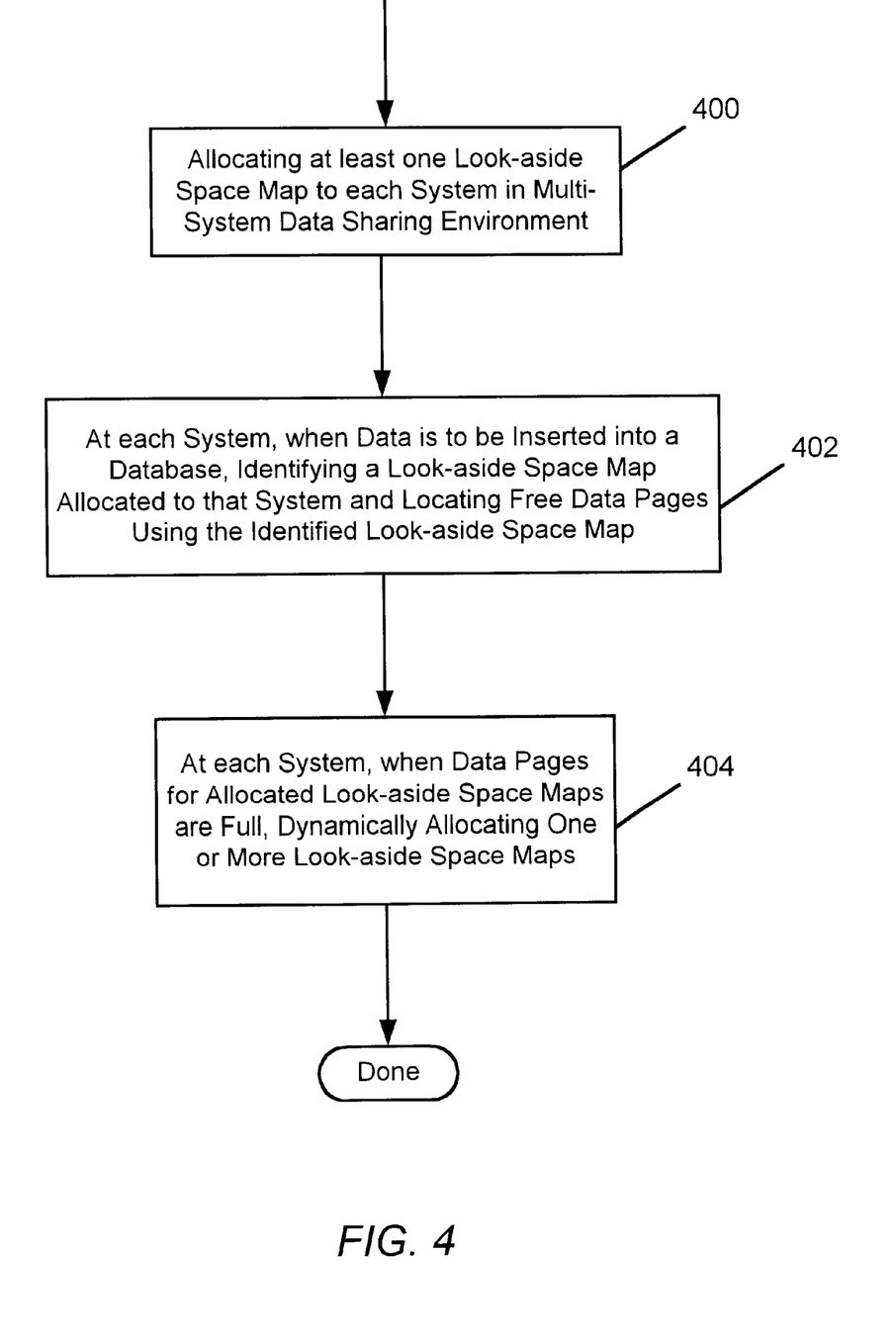
FIG. 4 is a flow diagram illustrating the steps performed by the insert system that could be used in accordance with the present invention.

FIG. 4 is a flow diagram illustrating the steps performed by the insert system 124 that could be used in accordance with the present invention. In Block 400, the insert system 124 allocates at least one look-aside space map to each system in a multi-system data sharing environment. In Block 402, at each system, when data is to be inserted into a database, the insert system 124, identifies a look-aside space map allocated to that system and locates free data pages using the identified look-aside space map. In Block 404, at each system, when data pages for allocated look-aside space maps are full, the insert system 124 dynamically allocates one or more look-aside space maps for that system.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or stand-alone personal computer, could be used with the present invention.

In summary, the present invention discloses a method, apparatus, and article of manufacture for a computer-implemented insert system. The present invention provides a technique for improving insert performance on a multi-system transaction. The present invention also provides look-aside space map pages to improve insert performance.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of storing data in a database stored on a data storage device connected to a plurality of computers, the method comprising the steps of:

allocating at least one look-aside space map to each system of a multi-system data sharing environment, wherein the look-aside space map identifies data pages associated with a corresponding system; and at each system of the multi-system data sharing environment, when data is to be inserted into the database, searching for a look-aside space map with one or more free data pages allocated to that system;

when a look-aside space map with one or more free data pages is identified, inserting data into the data pages referenced by the identified look-aside space map, wherein the insertion of data into each system is isolated from the insertion of data in each of the other systems; and when a look-aside space map with one or more free data pages is not found, dynamically allocating one or more additional space maps to that system.

2. The method of claim 1, wherein each look-aside space map references a different set of data pages in the database.

3. The method of claim 1, further comprising the step of:

at one of the computers, when a look-aside space map with one or more free data pages is not found, requesting another look-aside space map from the database.

4. The method of claim 3, wherein the step of requesting further comprises the step of requesting the look-aside space map with a conditional lock.

5. The method of claim 4, further comprising the steps of:

receiving an indication that the requested look-aside space map is not available; and requesting another look-aside space map with a conditional lock.

6. The method of claim 1, further comprising the steps of:

when a look-aside space map with one or more free data pages is found, locating a free data page using the found look-aside space map; and requesting the free data page with a conditional lock.

7. The method of claim 6, further comprising the steps of:

receiving an indication that the requested free data page is not available;

searching for another free data page; and requesting a free data page located by the searching with a conditional lock.

8. An apparatus for storing data, comprising:

a computer having a data storage device connected thereto, wherein the data storage device stores a database containing the partitioned data;

one or more computer programs, performed by the computer, for allocating at least one look-aside space map to each system of a multi-system data sharing environment, wherein the look-aside space map identifies data pages associated with a corresponding system, and at each system of the multi-system data sharing environment, when data is to be inserted into the database, searching for a look-aside space map with one or more free data pages allocated to that system; when a look-aside space map with one or more free data pages is identified, inserting data into the data pages referenced by the identified look-aside space map, wherein the insertion of data into each system is isolated from the insertion of data in each of the other systems; and when a look-aside space map with one or more free data pages is not found, dynamically allocating one or more additional space maps to that system.

9. The apparatus of claim 8, wherein each look-aside space map references a different set of data pages in the database.

10. The apparatus of claim 8, further comprising:

at one of the computers, means for, when a look-aside space map with one or more free data pages is not found, requesting another look-aside space map from the database.

11. The apparatus of claim 10, wherein the means for requesting further comprises the means for requesting the look-aside space map with a conditional lock.

12. The apparatus of claim 11, further comprising:

means for receiving an indication that the requested look-aside space map is not available; and means for requesting another look-aside space map with a conditional lock.

13. The apparatus of claim 8, further comprising the means for, when a look-aside space map with one or more free data pages is found, locating a free data page using the found look-aside space map; and requesting the free data page with a conditional lock.

14. The apparatus of claim 13, further comprising:

means for receiving an indication that the requested free data page is not available;

means for searching for another free data page; and means for requesting the free data page with a conditional lock that was found by the means for searching.

15. An article of manufacture comprising a computer program carrier readable by a computer and embodying one or more instructions executable by the computer to perform method steps for storing data in a database stored in a data storage device connected to the computer, the method comprising the steps of:

allocating at least one look-aside space map to each system of a multi-system data sharing environment, wherein the look-aside space map identifies data pages associated with a corresponding system;

at each system of the multi-system data sharing environment, when data is to be inserted into the database, searching for a look-aside space map with one or more free data pages allocated to that system;

when a look-aside space map with one or more free data pages is identified, inserting data into the data pages referenced by the identified look-aside space map, wherein the insertion of data into each system is isolated from the insertion of data in each of the other systems; and when a look-aside space map with one or more free data pages is not found, dynamically allocating one or more additional space maps to that system.

16. The article of manufacture of claim 15, wherein each look-aside space map references a different set of data pages in the database.

17. The article of manufacture of claim 15, further comprising the step of:
   at one of the computers,
      when a look-aside space map with one or more free data pages is not found, requesting another look-aside space map from the database.

18. The article of manufacture of claim 17, wherein the step of requesting further comprises the step of requesting the look-aside space map with a conditional lock.

19. The article of manufacture of claim 18, further comprising the steps of:
   receiving an indication that the requested look-aside space map is not available; and
   requesting another look-aside space map with a conditional lock.

20. The article of manufacture of claim 18, further comprising the steps of:
   when a look-aside space map with one or more free data pages is found, locating a free data page using the found look-aside space map; and
   requesting the free data page with a conditional lock.

21. The article of manufacture of claim 20, further comprising the steps of:
   receiving an indication that the requested free data page is not available;
   searching for another free data page; and
   requesting a free data page located by the searching with a conditional lock.

* * * * *

UNITED STATES PATENT AND TRADEMARK OFFICE
CERTIFICATE OF CORRECTION

| | | |
|---|---|---|
| PATENT NO. | : 6,334,134 B1 | Page 1 of 1 |
| DATED | : December 25, 2001 | |
| INVENTOR(S) | : Haderle, Donald James, Shibamiya, Akira, Teng, James Zu-chia, and Watts, Julie Ann | |

It is certified that error appears in the above-identified patent and that said Letters Patent is hereby corrected as shown below:

<u>Title page,</u>
Item [75], change the name of third inventor from "James Zu-Chia Tseng" to
-- James Zu-Chia Teng --.

Signed and Sealed this

Fourth Day of June, 2002

*Attest:*

JAMES E. ROGAN
*Attesting Officer*   *Director of the United States Patent and Trademark Office*